Patented July 28, 1936

2,049,198

UNITED STATES PATENT OFFICE 2,049,198

ALKALI EARTH METAL AUROTHIOGLYCOL-LATES AND PROCESS OF PRODUCING SAME

Raymond Delange, Versailles, France, assignor to Fabriques de Produits de Chimie Organique de Laire, Department of Seine, France, a company of France No Drawing. Application June 16, 1933,
Serial No. 676,203

6 Claims. (Cl. 260—11)

The present invention relates to the production of gold salts of thioglycollic acid for forming solutions or suspensions in aqueous or organic liquids, said solutions or suspensions being intended to be used for therapeutic purposes.

The organic auric derivatives that have been employed up to the present time for therapeutic purposes contain a percentage of metal at most equal to 50% for the known salts that are richest in gold, such as aurothioglucose ($C_5H_{11}O_5SAu$).

The object of the present invention is to provide organo-metallic compounds having a much higher percentage of precious metal.

The organo metallic compounds according to the present invention are derived from aurothioglycolic acid and consist chiefly of the salts or ethereal salts of this acid.

The proportions of gold, sulphur, and metal or metal-like radical in these salts correspond to the following constitutional formulas:

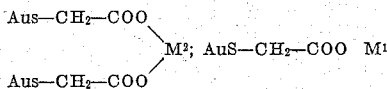

in which $M^2$ is a bivalent metal (or metal-like radical) and $M^1$ is a monovalent metal (or metal-like radical). In these salts the percentage of gold is much higher than in organo-metallic compounds used for the same purpose up to this time. For instance, in the calcium salt according to the general formula above given, the percentage of gold is 64.16.

It is possible, according to the present invention, to prepare sodium, lithium, strontium and other salts or aurothioglycolic acid, but the most important of these salts is calcium aurothioglycolate. In order to obtain this salt, I employ the following process:

Example I.—Calcium aurothioglycolate

Thioglycolic acid is first prepared by reducing dithioglycolic acid.

The thioglycolic acid that is thus obtained distills at a temperature ranging from 110 to 115° C. under a pressure of 18 mm.

Its ethyl ether boils at a temperature of 55° C. under a pressure of 17 mm. and its density at 15° C. is 1.0964.

The amide of this acid melts at a temperature of 52° C.

Thioglycolic acid, thus characterized, is employed to the preparation of aurothioglycolic acid in the following manner:

Approximately 140 parts of thioglycolic acid are dissolved in ten times their weight of distilled water.

On the other hand a solution of 200 parts of double chloride of gold and sodium (containing 50% of gold) is dissolved in ten times their weight of distilled water.

The two solutions are mixed together, being constantly stirred. The perfectly white insoluble aurous derivative precipitates rapidly. When the whole of the gold chloride has been added, the solution is left for some time and then treated by ammonia, which finally gives a bright yellow liquid. The limpid liquid is decanted in order to separate the heavy particles contained in the gold chloride.

To the solution thus obtained there is added 700 parts of a solution of pure calcium chloride of 1/20 strength. An abundant precipitate is produced. The whole is carefully stirred and the temperature is raised to, and maintained at, about 50° C. The whole is allowed to remain for about one day at ordinary temperature. The supernatant liquids are then decanted. The gold salt that was precipitated is freed from liquid and carefully washed with distilled water. Then it is dried in an oven and progressively assumes a red colour which is due to its state of dehydration. The red salt is dried by means of a water bath boiling in a vacuum until the weight remains constant. The yield that is obtained with this process is but little different from the theoretical yield with reference to the amount of gold chloride that is employed.

When the process gives slightly lower yields, the metal can be recovered from the mother waters resulting from the operations above mentioned of freeing the salt from liquid, decanting, and washing.

Calcium aurothioglycolate, which is not in the least toxic, and is not painful to administer in injections, can be employed in the form of solutions in oil of a strength of 10% for instance.

Of course the above process has been described merely by way of example and my invention applies to the production of all kinds of metal salts of aurothioglycolic acid. Among the other metal salts that can be obtained according to my invention, I can cite the following:

Sodium salts $$AuSCH_2-COONa$$

Magnesium salts

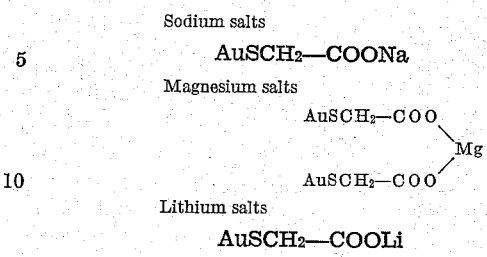

Lithium salts $$AuSCH_2-COOLi$$

and other salts, which are characterized in particular by the high percentage of gold that they contain.

Besides these double salts, I have prepared auric derivatives in which the only metal that is present is the noble metal, and which derive from the ethereal salts of thioglycolic acid, that is to say which are ethereal salts of aurothioglycolic acid and correspond to the following formula:

$$AuSCH_2-COOR$$

R being an alkyl radical.

I may cite as examples of these compounds ethyl aurothioglycolate, whose formula is:

$$AuSCH_2-COO-C_2H_5$$

and its homologues; also glycol diaurothioglycolate, whose formula is:

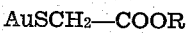

the last mentioned body being a white powder containing 65.45 gold.

Examples of the process according to my invention for obtaining these organo-metallic bodies will now be given:

*Example II.—Ethyl aurothioglycolate*

4 parts of ethyl thioglycolate are dissolved in 12 parts of 90° alcohol and this solution is added, while stirring constantly, to a filtered solution of 5 parts of gold chloride of 50% strength in precious metal in 10 parts of concentrated alcohol. A precipitate is formed which quickly becomes white and the complete precipitation of which is facilitated by heating slightly. The precipitate constitutes the auric derivative, which is then freed from liquid, washed, and finally carefully dried.

Through this process, there is obtained about 4 parts of the desired compound, which corresponds to the theoretical amount indicated by the formula:

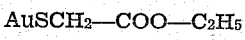

this compound being of a bright yellow colour and containing an amount of gold corresponding to a percentage of 62.34.

*Example III.—Glycol aurothioglycolate*

Glycol dithioglycolate is first prepared, this body boiling at temperatures ranging between 178 and 182° C. under pressures ranging between 12 and 14 mm. 11 parts of gold chloride are dissolved in ten times their weight of concentrated alcohol. This solution is filtered and poured gradually into a solution consisting of 8 parts of glycol thioglycolate dissolved in from 30 to 40 times its weight of absolute alcohol. The product, when precipitated and freed from liquid, is a perfectly white body, which is then carefully washed and dried.

The yield is of about 14 parts of glycol aurothioglycolate, the percentage of gold corresponding to the theoretical value of 65.45% according to the structural formula:

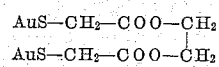

All the compounds of the various kinds that have been above described have their constitution determined by their process of production and their percentage of gold, as above explained.

Most of these organo-metallic compounds are perfectly soluble in an aqueous solution of thioglycolic acid in an alkaline medium.

While I have described some examples of my invention in order to better explain how it can be performed, I do not wish to be limited thereto as my invention is susceptible of other applications and modifications as comprehended within the scope of the accompanying claims.

In these claims it should be well understood that the word "salt" is to be taken in its general meaning of any compound formed when the acid hydrogen of an acid is partly or wholly replaced by a metal or an equivalent radical, for instance an alcohol residue, this definition therefore including both the metal salts and the ethereal salts.

What I claim is:

1. As a new product useful in therapeutics for injection purposes, calcium aurothioglycolate.

2. A process of preparing calcium aurothioglycolate which comprises, treating thioglycollic acid with double chloride of gold and sodium in an aqueous solution, subsequently treating by ammonia so as to obtain a bright yellow liquor, decanting, adding to this liquor a solution of calcium chloride, separating the precipitate, freeing it from liquid, washing and drying it.

3. As a new product useful in therapeutics for injection purposes, an alkali-earth metal salt of aurothioglycolic acid.

4. As a new product useful in therapeutics for injection purposes, magnesium aurothioglycolate.

5. As a new product useful in therapeutics for injection purposes, strontium aurothioglycolate.

6. A process of preparing an alkali-earth metal salt of aurothioglycolic acid which comprises forming thioglycolic acid, adding double chloride of gold and sodium to said thioglycolic acid in an aqueous medium, thereby forming an aqueous solution of sodium aurothioglycolate, treating said aqueous solution by ammonia, and adding to said solution a soluble alkali-earth metal salt so as to precipitate therefrom an insoluble alkali-earth metal salt of aurothioglycolic acid.

RAYMOND DELANGE.